United States Patent
Franck

(10) Patent No.: US 6,272,032 B1
(45) Date of Patent: Aug. 7, 2001

(54) RECTIFIER WITH MIDPOINT FEED

(75) Inventor: Felix Franck, München (DE)

(73) Assignee: Patent -Treuh nd-Gesellschaft fuer elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/635,208

(22) Filed: Aug. 9, 2000

(30) Foreign Application Priority Data

Aug. 11, 1999 (DE) .............................................. 199 37 924

(51) Int. Cl.$^7$ ...................................................... H02M 7/06
(52) U.S. Cl. ............................................................... 363/126
(58) Field of Search ..................................... 363/125, 126

(56) References Cited

U.S. PATENT DOCUMENTS 5,793,626 * 8/1998 Jiang ..................................... 363/126
5,831,846 * 11/1998 Jiang ..................................... 363/125

* cited by examiner

Primary Examiner—Jeffrey Sterrett
(74) Attorney, Agent, or Firm—Carlo S. Bessone

(57) ABSTRACT

The invention relates to a rectifier with midpoint feed, comprising a first and a second input terminal (A,B), which form an input of the rectifier, a first and a second output terminal (P,M), which form a first output of the rectifier, the first output terminal (P) forming the positive pole and the second output terminal (M) forming the negative pole of the first output of the rectifier, where a series circuit comprising a first and a second coupling capacitor ($C_1$, $C_2$) is arranged in parallel with the first output, the midpoint of the series circuit being connected to the second input terminal (B), a storage capacitor ($C_3$) is arranged in parallel with a series circuit comprising a first and a second diode ($D_1$, $D_2$), the midpoint of the series circuit made up of the first and the second diode ($D_1$, $D_2$) being connected to the first input terminal (A), and the first diode ($D_1$) being connected to the first coupling capacitor ($C_1$) via a first inductor, and the second diode ($D_2$) being connected to the second coupling capacitor ($C_2$) via a second inductor ($L_2$).

8 Claims, 2 Drawing Sheets

RECTIFIER WITH MIDPOINT FEED

FIELD OF THE INVENTION

The present invention relates to a rectifier with midpoint feed, in particular to a rectifier with midpoint feed.

BACKGROUND OF THE INVENTION

FIG. 1 shows such a rectifier with midpoint feed which is known from the prior art, the input being formed by the input terminals A and B while the output is formed by the output terminals P and M. In this arrangement, the output terminal P corresponds to the positive pole and the output terminal M corresponds to the negative pole. In order to be able to operate a rectifier at the output of a free-running inverter, i.e. the switching transistors are driven by direct feedback of the load current, it is desirable for the character of the rectifier following the inverter to be slightly inductive.

The rectifier shown in FIG. 1 comprises a series circuit comprising a first coupling capacitor $C_1$ and a second coupling capacitor $C_2$, the midpoint of which is connected to the input terminal B. The input terminal A is connected via an inductor $L_1$ to the midpoint of a series circuit comprising a first diode $D_1$ and a second diode $D_2$. Each diode has a polarity-reversal capacitor $C_{D1}$ or $C_{D2}$ connected in parallel with it. The series circuit comprising the first and the second coupling capacitor $C_1$, $C_2$ is connected to the output terminal P via an inductor $L_2$. Connected in parallel with the output is a storage capacitor $C_3$. By way of example, a series circuit comprising a plurality of light-emitting diodes is shown as the load.

In the circuit arrangement shown in FIG. 1, the inductor $L_2$ assumes the function of a smoothing inductor, i.e. it smoothes the direct current provided at the output terminals P, M, while the inductor $L_1$ caters for the inductive character of the rectifier.

In the circuit arrangement shown in FIG. 1, the inductors L1 and L2 in particular, have a disadvantageous effect, since they are by nature relatively large in comparison with other components and therefore take up a lot of the limited space on a circuit board. Furthermore, they are expensive and complicated to install as compared with SMD components.

SUMMARY OF THE INVENTION

The object of the present invention is therefore to provide a circuit arrangement which is improved as compared with the prior art shown in FIG. 1 and in which the disadvantages of the prior art are reduced.

This solution affords the advantage that the two inductors simultaneously act as a polarity-reversal inductance, namely the parallel circuit comprising $L_1$ and $L_2$, and as a smoothing inductance, namely the series circuit comprising $L_1$ and $L_2$. This means that the load is evenly distributed over the two inductors, which is why simpler components can be used. This results in a significant reduction in cost. In particular, the inductor $L_1$ does not need to be as powerful and the inductor $L_2$ does not need to be as large as in the circuit arrangement which is known from the prior art and is shown in FIG. 1. The space requirement for the inductors $L_1$ and $L_2$ on the circuit board has therefore been significantly reduced.

In one particularly advantageous embodiment, for each further output of the rectifier, the following combination can be connected in parallel with the corresponding combination for the first output: a further storage capacitor, a further second inductor, a further second diode and a further second coupling capacitor. In the prior art shown in FIG. 1, a plurality of outputs can be provided as a result of a plurality of loads being connected in parallel at the output P, M. In the case of light-emitting diodes, a load is defined by a respective series resistor in series with a series circuit comprising a plurality of light-emitting diodes. In this case, the differential output impedance is determined by the respective series resistor. In contrast to this, the differential output impedance can be increased, on the basis of the resistance of an individual path, by more than a factor of 5 as a result of the inventive measure mentioned, i.e. different voltages at the respective outputs result in a current difference between the respective outputs which—in comparison to the prior art—is reduced by more than a factor of 5.

Preferably, the first diode has a first polarity-reversal capacitor connected in parallel with it, and/or at least one and/or each second diode has a respective second polarity-reversal capacitor connected in parallel with it. The polarity-reversal capacitors are preferably in the form of ZVS resonance capacitors.

The capacitance value of the first coupling capacitor is preferably essentially the same as the sum of the capacitance values of all the second coupling capacitors and is preferably between 10 nF and 200 nF. The capacitance value of each storage capacitor is essentially approximately twice the capacitance value of the first coupling capacitor.

The coupling of the first inductor to at least one second inductor and/or the coupling of at least two of the second inductors to one another is particularly advantageous. This affords the option of producing at least two inductors using a single component, i.e. at least two inductors are wound on a single core. This results in a further reduction in the space required for the inductors.

If the first and at least one of the second inductors are coupled to one another, then the coupling is preferably such that the principal inductances of the first and of the at least one second inductor cause the output current to be smoothed, and that the leakage inductances of the first and of the at least one second inductor act as a polarity-reversal inductance. The load distribution which this achieves permits smaller dimensions for the components and results in the useful life thereof being increased.

Further advantageous refinements of the invention can be found in the dependent claims.

BRIEF DESCRIPTION OF THE DRAWINGS

Illustrative embodiments of the invention are described in more detail below with reference to the appended drawings, in which:

FIG. 2 shows a first embodiment of a rectifier according to the invention, where dashed lines show the course of the direct current and dotted lines show the course of the AC components. While

BEST MODE FOR CARRYING OUT THE INVENTION

Unless indicated otherwise, identical reference symbols denote identical components in FIGS. 2a, 2b, 3 and 4. By way of example, the load shown in all figures is a series circuit comprising a plurality of light-emitting diodes. In general, however, the rectifier according to the invention can be used for all applications which can be operated using a DC source.

Figure 2A:
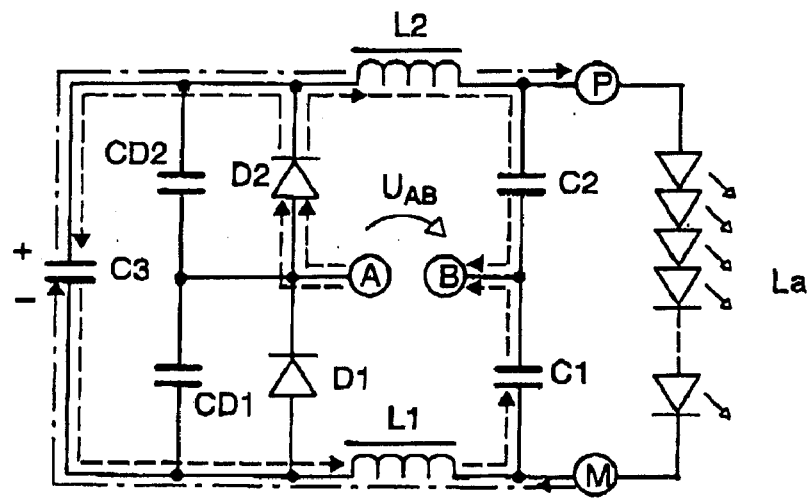
FIG. 2a shows the courses of the direct current and the alternating current when there is a positive voltage $U_{AB}$ between the input terminals A and B.

FIG. 2a shows a first embodiment of a rectifier according to the invention. It comprises a series circuit comprising two coupling capacitors $C_1$, $C_2$ whose midpoint is connected to the input terminal B. The midpoint of a series circuit comprising a first diode $D_1$ and a second diode $D_2$ is connected to the input terminal A. Arranged in parallel with each diode is a polarity-reversal capacitor $C_{D1}$ and $C_{D2}$, respectively. The diode $D_2$ is connected to the coupling capacitor $C_2$ via an inductor $L_2$, while the diode $D_1$ is connected to the coupling capacitor $C_1$ via an inductor $L_1$. The point of connection between the inductor $L_2$ and the coupling capacitor $C_2$ forms a first output terminal P, which represents the positive pole. The point of connection between the inductor $L_1$ and the coupling capacitor $C_1$ forms a second output terminal M, which represents the negative pole. Connected in parallel with the diode path, comprising the diodes $D_1$ and $D_2$, is a storage capacitor $C_3$.

Figure 2B:
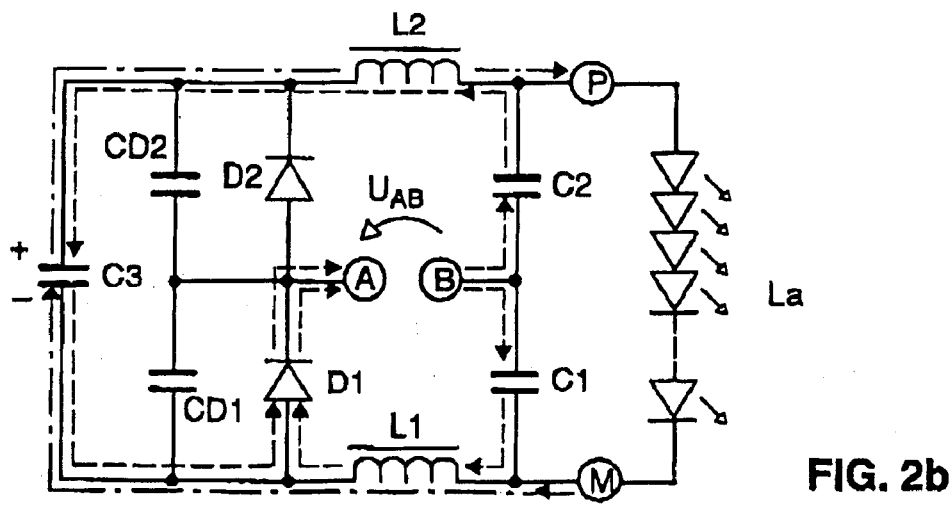
FIG. 2b shows their courses when there is a negative input voltage $U_{AB}$.

FIGS. 2a and 2b show the direct current course in dashed lines, and the alternating current courses in dotted lines. FIG. 2a shows the respective courses for a positive voltage $U_{AB}$ on the input terminals A, B, while FIG. 2b shows the corresponding current courses for a negative input voltage $U_{AB}$.

First to FIG. 2a: starting from the input terminal A, a first part of the alternating current flows in the network formed by the diode $D_2$, the inductor $L_2$ and the coupling capacitor $C_2$ to the second input terminal B. A second component of the alternating current flows via the diode $D_2$, the storage capacitor $C_3$ and also the inductor $L_1$ and the coupling capacitor $C_1$ to the second input terminal B. This second current component charges the storage capacitor $C_3$. The direct current flows through the load La in the network comprising the output terminal M, the inductor $L_1$, the storage capacitor $C_3$, the inductor $L_2$ and the output terminal P. In FIG. 2b, the direct current course is unchanged as compared with FIG. 2a, as required, whereas a first AC component now flows from the input terminal B via the coupling capacitor $C_1$, the inductor $L_1$ and the diode $D_1$ to the second input terminal A. The second AC component flows via the second coupling capacitor $C_2$, the inductor $L_2$, the storage capacitor $C_3$ and the diode $D_1$ to the second input terminal A. In this case too, this second AC component charges the storage capacitor $C_3$.

From the charge balance in $C_3$, it is clear that the direct current can be a maximum of half the alternating current. While half of the alternating current charges the storage capacitor $C_3$, the other half is used to recharge a respective coupling capacitor $C_1$ or $C_2$.

It is also evident that the sum of the inductances $L_1$ and $L_2$ is in series with the output terminals M and P, while the parallel circuit comprising the inductors $L_1$ and $L_2$ acts in series with the input terminals A and B.

The two inductors $L_1$, $L_2$ are therefore loaded to the same extent and can be produced using identical components. Whereas the polarity-reversal capacitors $C_{D1}$ and $C_{D2}$ have a capacitance value of a few nF and act as ZVS resonance capacitors, the capacitors $C_1$, $C_2$ and $C_3$ have significantly higher values. The coupling capacitors $C_1$ and $C_2$, which are in direct proximity to the load La, decouple the load from all AC components. Their capacitance value is preferably in the range from 10 to 200 nF.

Figure 1:
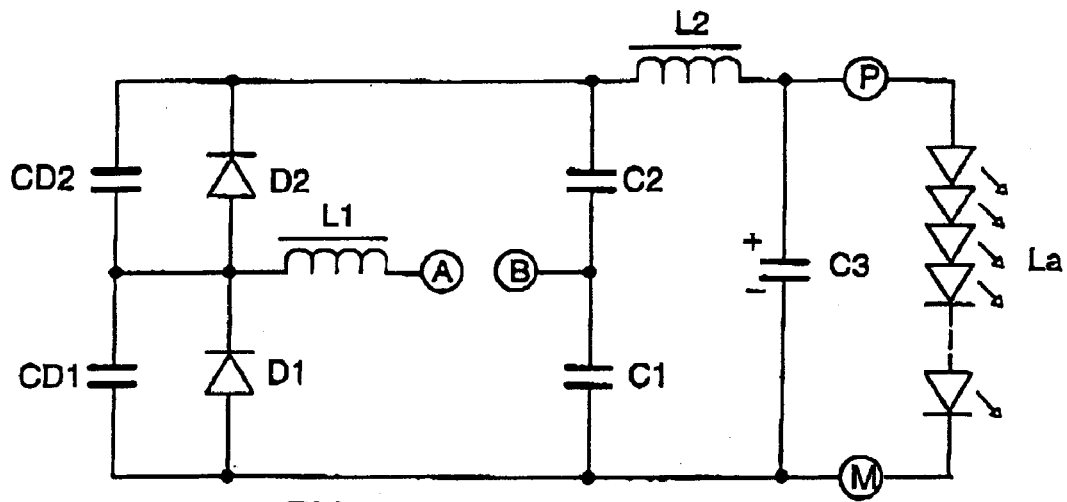
FIG. 1 shows a rectifier with midpoint feed from the prior art.

The value of the storage capacitor $C_3$ is approximately twice as high as that of the coupling capacitor $C_1$. The inductors $L_1$ and $L_2$ decouple the diode path comprising the diodes $D_1$ and $D_2$, which is "backed up" by $C_3$, from the capacitive path comprising the coupling capacitors $C_1$ and $C_2$. The capacitance between the output terminals P and M is consequently much lower than in the prior art shown in FIG. 1. In terms of the characteristics of the output between the output terminals P and M, the inductance $L_1+L_2$ is dominant. This is preferable particularly for the operation of light-emitting diodes, since a relatively low output capacitance and relatively high inductance come closer to an ideal current source than the circumstances in the prior art shown in FIG. 1.

Figure 3:
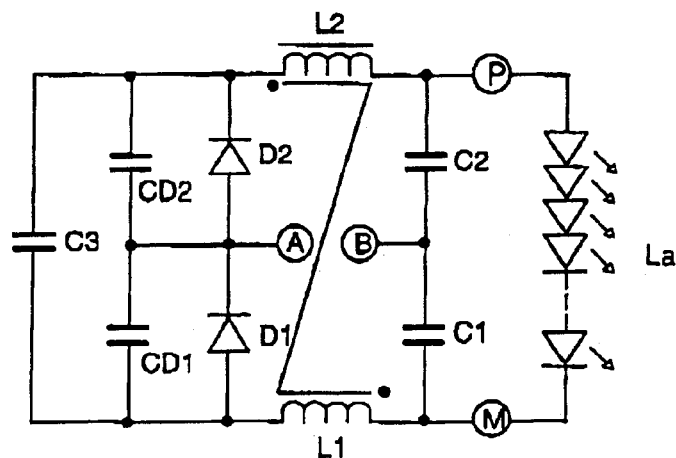
FIG. 3 shows a second embodiment of the invention, in which the inductors $L_1$ and $L_2$ are coupled to one another.

A further embodiment of the rectifier according to the invention is shown in FIG. 3. In this arrangement, the inductors $L_1$ and $L_2$ are coupled to one another, specifically such that the respective principal inductances cause the output current to be smoothed, and that the leakage inductances of the respective inductors act as a polarity-reversal inductance. If the two inductors $L_1$ and $L_2$ are wound on one core, then this core can have a dual purpose.

Figure 4:
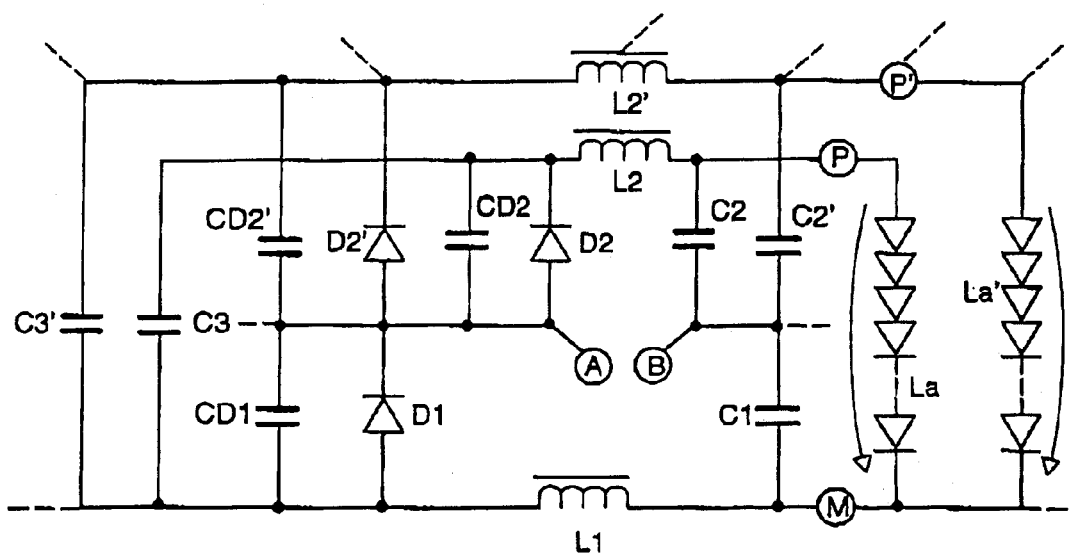
FIG. 4 shows a third embodiment of the invention having a plurality of parallel outputs $P_1$, $P_2$ etc.

FIG. 4 shows a development of the rectifier according to the invention and has a plurality of outputs. The first output is formed by the output terminals P and M, the second output is formed by the output terminals P' and M etc. For each further output, it is necessary to provide a further coupling capacitor $C_2'$, a further inductor $L_2'$, a further diode $D_2'$, a further polarity-reversal capacitor $C_{D2}'$ and a further storage capacitor $C_3'$. As regards the inductors, provision may be made for at least one inductor $L_2$, $L_2'$ to be coupled to the inductor $L_1$. In addition, provision may be made for inductors $L_2$, $L_2'$ etc. to be coupled to one another. In the case of the rectifier shown in FIG. 4, the same output impedance acts for all outputs. In contrast to the prior art described, a series resistor is not necessary. This measure allows the differential output impedance to be increased, as compared with the prior art, by a factor of greater than 5 with respect to the resistance of an individual path in the implementation in accordance with the aforementioned prior art. Voltage fluctuations at the various outputs therefore result in much smaller current fluctuations.

What is claimed is:

1. A rectifier with midpoint feed, comprising:

a first and a second input terminal (A,B), which form an input of the rectifier, a first and a second output terminal (P,M), which form a first output of the rectifier, the first output terminal (P) forming the positive pole and the second output terminal (M) forming the negative pole of the first output of the rectifier, wherein a series circuit comprising a first and a second coupling capacitor ($C_1$, $C_2$) is arranged in parallel with the first output, the midpoint of the series circuit being connected to the second input terminal (B), wherein a storage capacitor ($C_3$) is arranged in parallel with a series circuit comprising a first and a second diode ($D_1$, $D_2$), the midpoint of the series circuit made up of the first and the second diodes ($D_1$, $D_2$) being connected to the first input terminal (A), and the first diode ($D_1$) being connected to the first coupling capacitor ($C_1$) via a first inductor, and the second diode ($D_2$) being connected to the second coupling capacitor ($C_2$) via a second inductor ($L_2$).

2. The rectifier as claimed in claim 1, further comprising a second output (P', M) of the rectifier, the following combination being associated with the first output:

a further storage capacitor ($C_3'$), a further second inductor ($L_2'$), a further second diode ($D_2'$) and a further second coupling capacitor ($C_2'$).

3. The rectifier as claimed in claim 2, wherein the first diode ($D_1$) has a polarity-reversal capacitor ($C_{D1}$) connected in parallel therewith, or at least one of the second diode ($D_2$) and the further second diode ($D_2'$) has a polarity-reversal capacitor ($C_{D2}$, $C_{D2}'$) connected in parallel therewith.

4. The rectifier as claimed in claim 2, wherein the capacitance value of the first coupling capacitor ($C_1$) is essentially the same as the sum of the capacitance values of the second coupling capacitor ($C_2$) and the further second coupling capacitor ($C_2'$), and is preferably between 10 nF and 200 nF.

5. The rectifier as claimed in claim 2, wherein at least two of the first inductor ($L_1$), the second inductor ($L_2$), and the further second inductor ($L_2'$) are wound on a single core.

6. The rectifier as claimed in claim 2, wherein the first inductor ($L_1$) is magnetically coupled to at least one of the second inductor ($L_2$) and each further second inductor.

7. The rectifier as claimed in claim 6, wherein the magnetic coupling is such that the principal inductances of the first inductor and of the at least one of the second inductor and each further second inductor cause the output current to be smoothed, and that the leakage inductances of the first inductor and of the at least one of the second inductor and each further second inductor act as a polarity-reversal inductance.

8. The rectifier as claimed in claim 1, wherein the capacitance value of the storage capacitor ($C_3$, $C_3'$) is approximately twice the capacitance value of the first coupling capacitor ($C_1$).

* * * * *